United States Patent [19]

Rodgers

[11] Patent Number: 4,529,211
[45] Date of Patent: Jul. 16, 1985

[54] PIPE JOINT AND SEAL

[76] Inventor: William Rodgers, 41-45 Henderson St., Turrella, N.S.W. 2205, Australia

[21] Appl. No.: 479,648

[22] Filed: Mar. 25, 1983

[30] Foreign Application Priority Data

Mar. 29, 1982 [AU] Australia ............................. PF3364

[51] Int. Cl.³ .............................................. F16J 15/32
[52] U.S. Cl. .................................... 277/63; 277/207 A
[58] Field of Search .............. 277/63, 207 A, DIG. 2, 277/DIG. 3, 152

[56] References Cited

U.S. PATENT DOCUMENTS

| | | | |
|---|---|---|---|
| 1,818,985 | 8/1931 | Burnish | 277/63 |
| 1,945,293 | 1/1934 | Pierce | 277/63 |
| 4,063,743 | 12/1977 | Petros | 277/63 |

Primary Examiner—Robert I. Smith
Attorney, Agent, or Firm—Darby & Darby

[57] ABSTRACT

Flexible seals for joints in pipes for example spigots, flange and sleeve joints are disclosed. A ring seal for seating in the seal groove as a pipe joint between a first pipe and a second pipe consists of a ring body, an annular cavity defined by the ring body, a pair of annular sealing lips axially spaced on the ring body and joined by a midportion of the body and a passage through the ring body defines a fluid path from the zone between the sealing lips to a test-orifice in one of the pipes, flanges or sleeve. Various configurations of seals are disclosed.

A method of pressure testing the joint is disclosed. A method of charging the joint with root growth inhibiting chemical is disclosed.

7 Claims, 9 Drawing Figures

PIPE JOINT AND SEAL

FIELD OF THE INVENTION

This invention concerns flexible seals for joints in pipes for example spigot joints and flange joints.

BACKGROUND OF THE INVENTION

When the pipes are joined with flexible rings it is essential that the ring pressure against the two pipes should exceed the fluid pressure to which the rings are later subjected. Lip seal rings fulfil this requirement well and U or V cup packings (see FIG. 1) with a thin flexible lip establish a seal with only small initial jointing force while allowing large jointing tolerances with high sealing pressures. As the pipe fluid pressure always tends to spread the flanges of the seal, sealing pressure always exceeds the pipe fluid pressure.

In pipelines where each joint must be tested for fluid tightness against a stipulated pipeline pressure it is known to provide the female half of the spigot joint with a pair of seal ring grooves each receiving a sealing ring such as an "O" ring so that the space between the rings may be pressure tested to verify the integrity of each "O" ring. If a U or V cup packing is used (see FIGS. 2/3) and the male or spigot half of the joint is offered the first cup packing presents a trailing edge to the incoming pipe but the second presents a leading edge and jamming tends to result.

A characteristic of these lip seal joints is that when fluid pressure is applied to the interior of the ring the pressure assists the sealing action while when applied in the opposite direction the fluid pressure tends to lift the seal off its seating. This function is exemplified in a bicycle pump where the lip seal on the piston seals the air for pumping in the forward direction and acts as a non-return valve allowing air to pass in the reverse direction. See FIG. 2. From these characteristics of lip seals, it can be seen that for pipe sealing applications they are excellent seals able to span large gaps between the sealing faces but will only seal against fluid pressure in the direction towards the lips and will only allow a pipe spigot to be inserted towards the base of the ring.

SUMMARY OF THE INVENTION

The apparatus aspect of this invention provides a ring seal for seating in the seal groove of a pipe joint between a pipe spigot and a pipe socket bell or cup comprising
 (a) a ring body having a mid-portion
 (b) a first pair of annular sealing lips axially spaced on the ring body for contacting the pipe spigot
 (c) a second pair of annular sealing lips axially spaced on the ring body for contacting the pipe cup, one of the pairs of sealing lips being mutually connected by the mid portion of the ring body.

In a preferred embodiment the ring body is hollow with an inner circumferential seal wall and an outer circumferential seal wall, a pair of annular end walls joining the pair of seal walls and a pair of circumferential sealing lips projects from the surface of each circumferential seal wall at least one of the seal walls constituting the mid-portion. It is practical to manufacture the ring seal such that the two pairs of lip seals are symmetrically arranged such that a spigot pipe may engage the seal from either of two mutually opposite directions. Installation is eased if the annular faces of each lip seal which tends to obstruct the sliding surfaces of the joint, are each inclined transversely to the direction in which the joint is assembled, in order to provide a chamfered lead-in to the entering pipe.

In another embodiment the ring seal comprises
 (a) a ring body which is substantially diamond shaped in section with
 (b) an inner circumferential seal wall
 (c) a first pair of lip seals projecting from the seal wall the portion of the seal wall lying between the pair of lip seals constituting the mid-portion of the ring body
 (d) a pair of mutually inclined seal walls each of which extend from a respective end of the inner circumferential seal wall and is inclined to the latter
 (e) a second pair of mutually separated lip seals defined by the ends of the inclined seal walls
 (f) the inner seal wall and the pair of mutually inclined seal walls defining between them an annular cavity
 (g) an aperture defined by the mid portion and passing through the same which permits, after installation, the imposition of a common fluid pressure on all four lip seals.

In yet another embodiment the ring seal comprises
 (a) a ring body of modified C- section with
 (b) an inner circumferential seal wall
 (c) a first pair of lip seals projecting from the seal wall for containing the spigot pipe, the portion of the seal wall lying between the pair of lip seals constituting the mid-portion of the ring body
 (d) a pair of annular end walls for contacting the side walls of the seal groove and
 (e) a pair of outer circumferential seal wall each of which partly overlies the inner circumferential seal wall and terminates in a lip seal for containing the cup and
 (f) a perforation defined by the mid-portion and passing through the same which permits, after installation, the imposition of a common sealing pressure on all four lips.

In a further embodiment the ring body is of substantially dumbell shaped cross-section comprising a pair of circular side by side ribs joined by a waisted mid-portion each rib having an outward facing sealing face, and an inward facing sealing face, each face having a sealing lip the lips being arranged as an outer pair for sealing against a cup pipe and the inner pair seals against the spigot pipe and a perforation through the waisted portion permits after installation, the imposition of a common sealing pressure.

The method aspect of this invention provides groove and a liquid containing a root growth-inhibiting compound is injected into the hollow annular space within the ring body, whereafter the perforation in the pipe cup is closed.

The pipes may be made of steel, cast iron, non-ferrous metal, concrete, asbestos cement, fibre reinforced plastics, extruded thermoplastic, vitrified clay, glass, ceramic and the like.

DESCRIPTION OF THE EMBODIMENTS

Figure 5:
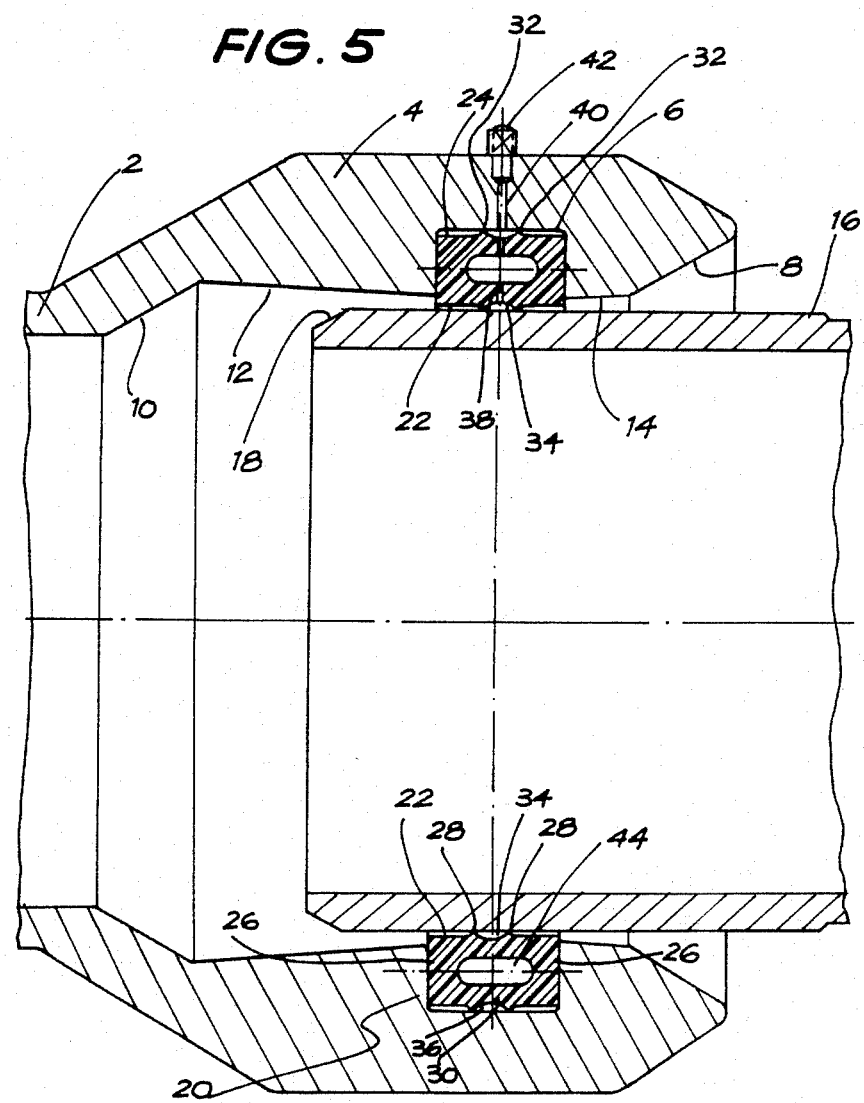
FIG. 5 is a section of a pipe spigot and cup joint containing the preferred form of ring seal.
Figure 6:
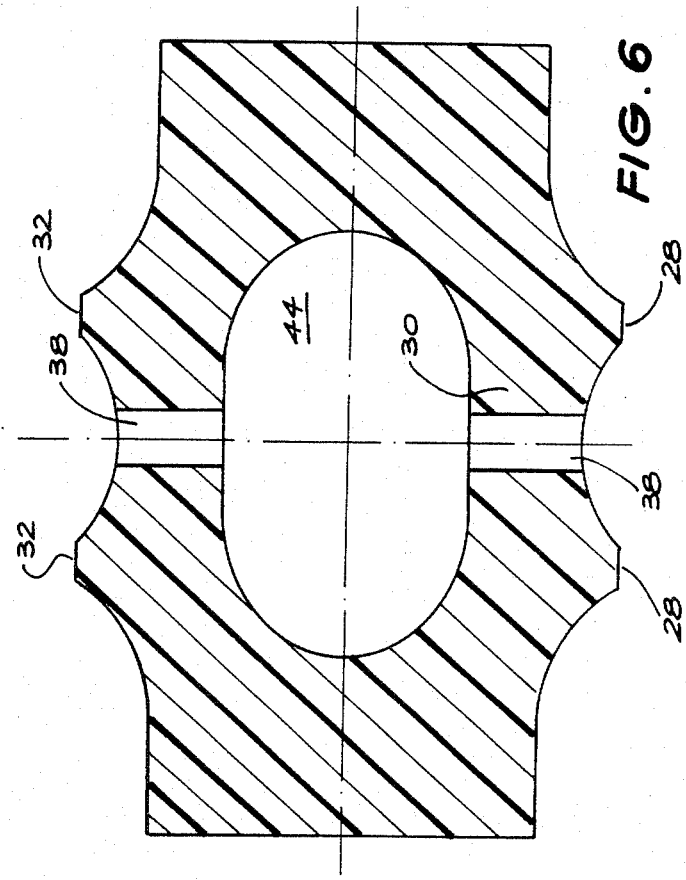
FIG. 6 is an enlarged section of the ring seal shown in FIG. 5 showing yet another form of ring seal.

Referring firstly to FIGS. 5 and 6 a fibreglass and resin pipe 2 has a cup 4 with a square groove 6 moulded or formed therein during manufacture. The entrance to the cup has a chamfer 8 and the shoulder 10 where the cup meets the pipe is inclined. The interior faces 12, 14 of the cup are tapered to the groove as shown.

The spigot 16 of the joining pipe has a chamfer 18 which seats on the shoulder 10 if the two pipes are pushed hard together. The seal ring 20 is of generally hollow rectangular cross section having an inner circumferential seal wall 22 and an outer circumferential seal wall 24 joined by end walls 26. These four walls enclose a hollow 44. The seal wall 22 has a pair of lip seals 28 projecting from its surface which can undergo only limited axial separation during jointing because they are connected by the mid-portion 30 of seal wall 22. Likewise wall 24 has a pair of lip seals 32. The latter engage the groove bed 34 while the inner lips 28 engage the spigot 16. The lips 28 and 32 define between them and the surfaces which they engage an inner annular pocket 34 and an outer annular pocket 36. These two pockets are connected by one or more perforations 38 which pass through both seal walls 22, 24 and the hollow 44. The cup has a bore 40 stopped by cap 42 which bore terminates in pocket 34.

The purpose of the bore 40 is to permit the joint to be tested. When the spigot is pushed into the cup a hand pump and gauge (not shown) is connected to bore 40 so that the two pockets 34, 36 and the hollow 44 in the ring body are pressurized to the appropriate test pressure for the particular fluid the pipes are to carry. The next joint is made so that sufficient time elapses for any leakage present to show on the gauge. If no pressure fall is evident the pressure source is disconnected and the cap 42 is replaced.

Alternatively a fresh connection is made to a liquid pump which injects root growth inhibiting solution into the pockets and the hollow of the ring body.

Figure 7:
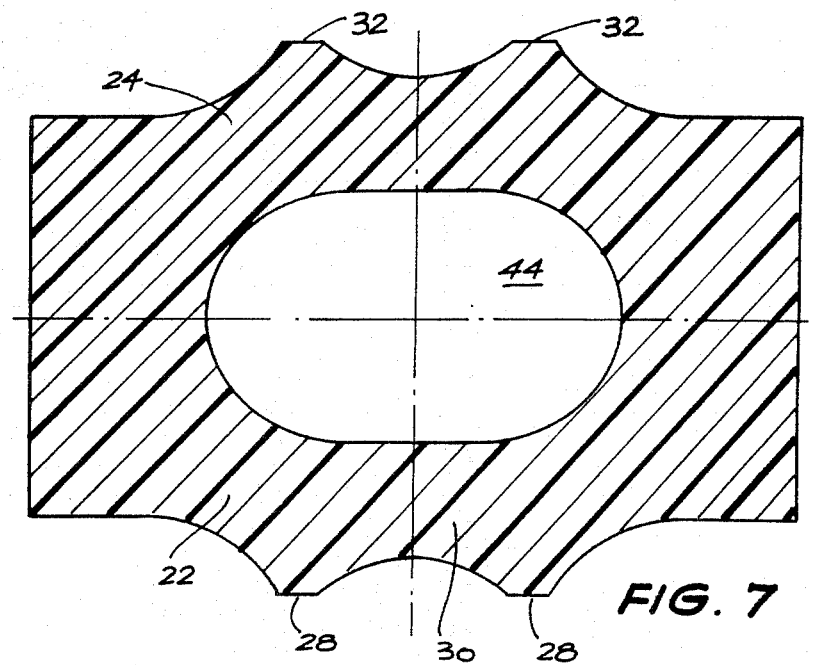
FIG. 7 is an enlarged section of the ring seal shown in FIG. 5 but without perforations.

When internal pressure is applied to the pipe the fluid will transmit this pressure to the inner sealing faces 28 and 32 and if this pressure is greater than the sealing pressure at 28 and 32 the fluid will flow past into the pockets 34 and 36 and the hollow 44. The fluid pressure inside the hollow 44 will then be added to the sealing pressure at 28 and 32 then automatically increasing the sealing ability as the pressure increases. The seal operates in a similar manner if the pressure inside the pipe is less than the outside pressure.

Where joint testing is not required the ring seal of FIG. 7 is used. This version is the same as shown in FIG. 6 except that the perforation 38 is absent.

Figure 1:
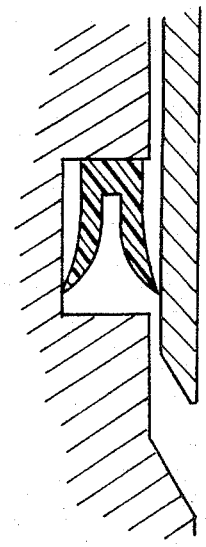
FIG. 1 is a section of part of a known lip seal in a spigot and cup joint before the seal is pressurised.
Figure 2:
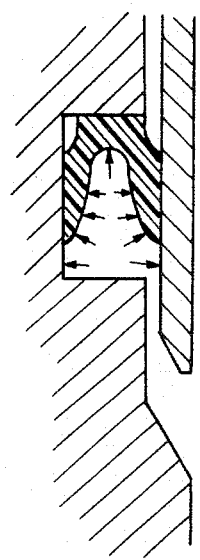
FIG. 2 is the same section as FIG. 1 with a known lip seal under pressure.
Figure 3:
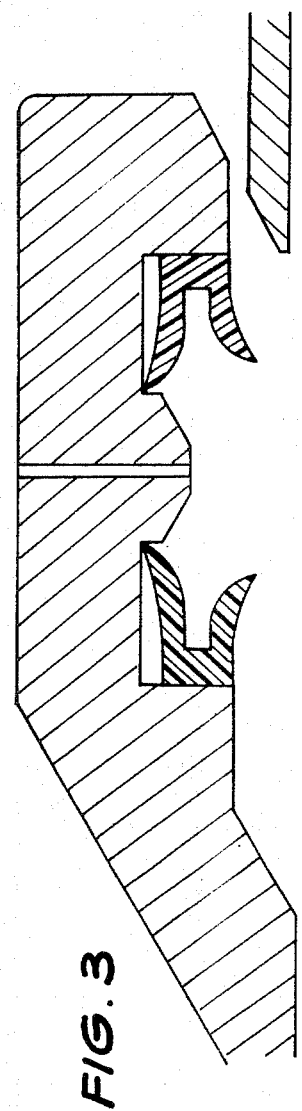
FIG. 3 is a section of a pipe cup with two separate known lip seals in position about to be contacted by a pipe spigot.
Figure 4:
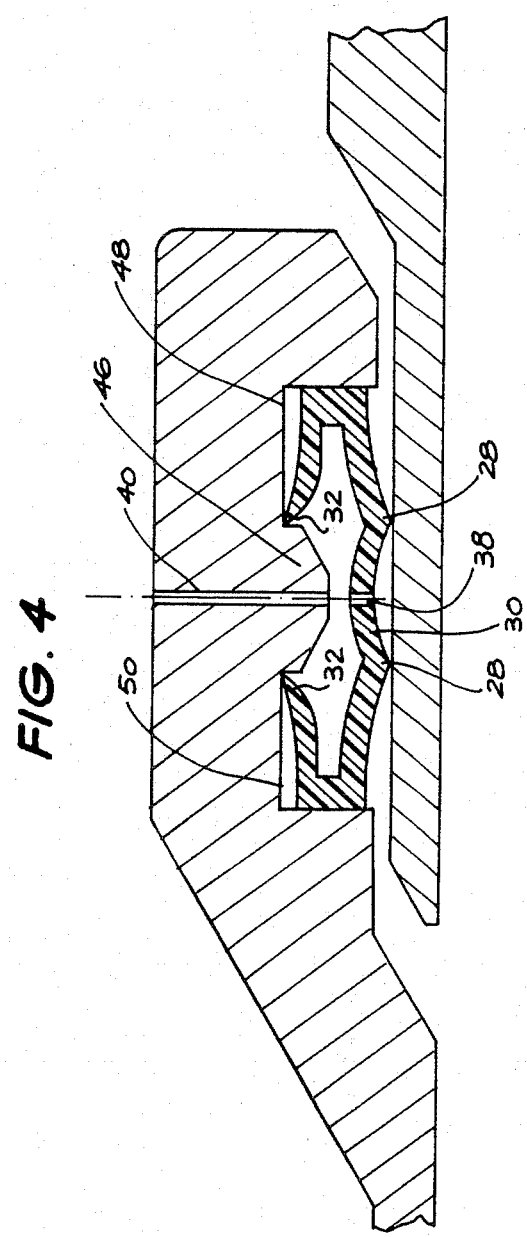
FIG. 4 is a section of a pipe spigot and cup joint containing one form of ring seal according to the invention.

From a study of FIG. 4 it will be seen that it is not necessary to have a seal section in which both pairs of seals are mutually connected. In FIG. 4 the groove 6 has a central rib 46 which provides a separate groove 48, 50 for each outer lip seal 32. When pressurised the seals 32 will deform somewhat as shown in FIG. 2.

Figure 8:
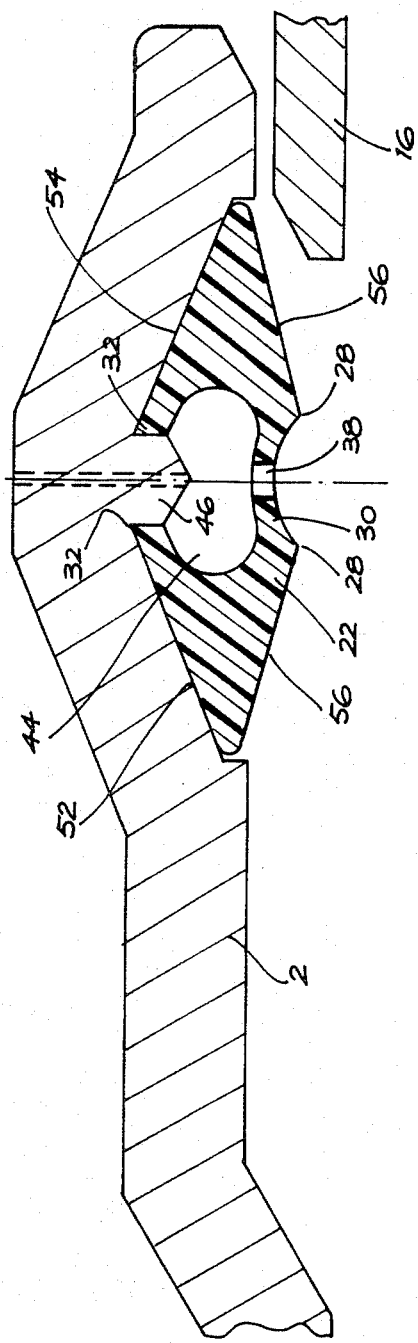
FIG. 8 is a section through a fragment of a joint showing another form of ring seal.

In FIG. 8 the groove is again divided by rib 46 into a separate groove 52, 54 for each lip seal 32. Here the section of the ring body is that of a modified diamond with the inner seal wall 24 providing a generous chamfer 56 as a lead-in for the spigot 16.

Figure 9:
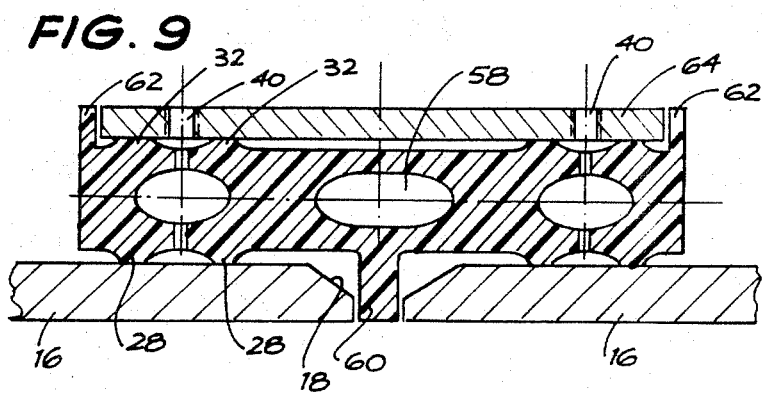
FIG. 9 is a section through a fragment of a joint using a rigid coupling sleeve and a sleeve-like ring seal.

In FIG. 9 the ring seal is a modified sleeve with a central cavity 58 and central pipe stop 60. The sleeve has ends 62 which locate it on a rigid coupler 64 provides with the threaded test bores 40. The inner lip seals 28 and outer lip seals 38 occupy the same relative positions as in the other seals described above.

All the seals described in the above embodiments are made of neoprene but other rubber like polymers as are already used for seals may be used.

We have found the advantages of the ring seal of FIGS. 5 and 6 to be as follows:

1. Its symmetric section enables it to be installed either way round thus avoding installation errors.

2. It has chamfered or curved lead-in surfaces which are sufficiently flexible to allow of easy insertion of the spigot and yet apply high line sealing pressures at the edges of the lips. These high sealing pressures prevent root growth.

3. The lip seals in the socket recess have high line sealing pressures in both directions.

4. The flexibility of the inner lips ensure the seals ability to accommodate large radial clearances between spigot and socket, ovality of pipes and large angular misalignment of the joint.

5. When pressure is applied to the seal the fluid enters the annulus between spigot and sockets, lifts the first inner lip seal and passes via the hole into the annular space of the seal. There the fluid pressure exerts a force on the second set of lip seals, pressing the second half of the seal against both the socket and spigot and increasing the sealing pressures. As the sealing system is symmetric this works in both directions preventing both loss of fluid from inside by internal pressure on ingress of external fluids due to external pressure differences.

6. By applying pressure via the pressure test bore connection both seals are pressed by fluid pressure against both spigot and socket and the fluid passes through the holes in the web to test the inner lip seal against the spigot. Thus the joint may be tested against both internal and external pressure and if any leaks are found the last pipe section may be withdrawn for repairs or replacement.

7. The double opposed lip seal housing is contained in the socket where it is largely protected from damage and the spigot is a plain parallel cylinder which is easily restored if damaged by scratching or abrasion. The seal is contained and located in its housing in the socket by contact of the outer lip seals with the outer lip seal location in this way the spigot may be moved in either direction for installation, withdrawal or due to in-service pipe movement without the possibility of uncontrolled seal movement, and jamming.

8. The double opposed lip seal housing may be contained in the outside of the pipe spigot wih a plain parallel socket.

9. The sealing pressure of the seal is testable simultaneously for egress of pipe fluid and ingress of contaminant from outside the pipes because as the test fluid applies pressure up to the required test pressure the four sealing lips are tested against spigot and socket and the pressure expands the seal in its housing to increase the sealing effect.

10. Because of the large radial clearances which can be sealed by this flexible lip system large angular misalignment can be accommodated by this jointing system.

11. In special cases where larger angular changes are necessary at the joints the socket is tapered from a minimum diameter at the ring housing to expand towards both the outer and the inner end of the socket.

What we claim is:

1. A ring seal for seating in the seal groove of a pipe joint between a first pipe and a second pipe, comprising:
   a hollow ring body having an inner seal wall and an outer seal wall,
   a pair of end walls connecting said inner and outer seal walls,
   a pair of axially spaced circumferential sealing lips projecting inwardly from said inner seal wall,
   a pair of axially spaced circumferential sealing lips projecting outwardly from said outer seal wall, and
   a bore extending through both said inner seal wall and said outer seal wall between the sealing lips of both of said pairs of axially spaced circumferential sealing lips.

2. A ring seal as claimed in claim 1 wherein
   the two pairs of sealing lips are symmetrically arranged such that an entering pipe may engage the seal from either of two mutually opposite directions.

3. A ring seal as claimed in claim 1 wherein
   the annular faces of each sealing lip which tend to obstruct the sliding surfaces of the joint, are each inclined transversely to the direction in which the joint is assembled, in order to provide a chamfered lead-in to an entering pipe.

4. A ring seal as claimed in claim 1 wherein
   after installation in a joint the pair of seals which engage an incoming pipe define between themselves, the mid portion of the inner seal wall and the spigot pipe, an interconnected annual pocket capable of retaining a liquid.

5. A ring seal as claimed in claim 1 wherein
   the ring seal is made of a length of extruded elastomer joined into a ring by a moulded or adhered bridge of elastomer.

6. A ring seal as claimed in claim 1, wherein:
   said axially spaced circumferential sealing lips define an annular inner pocket and an annular outer pocket, each of said pockets being capable of retaining a liquid, and wherein said bore extends between the two sealing lips of each of said pairs.

7. A ring seal as claimed in claim 6, wherein said seal is symmetrical.

* * * * *